(12) United States Patent
Tsuchiya (10) Patent No.: US 10,320,267 B2
(45) Date of Patent: Jun. 11, 2019

(54) ROTARY ELECTRIC MACHINE

(71) Applicant: DENSO CORPORATION, Kariya, Aichi-pref. (JP)

(72) Inventor: Hiroyuki Tsuchiya, Kariya (JP)

(73) Assignee: DENSO CORPORATION, Kariya (JP)

( * ) Notice: Subject to any disclaimer, the term of this patent is extended or adjusted under 35 U.S.C. 154(b) by 186 days.

(21) Appl. No.: 15/166,993

(22) Filed: May 27, 2016

(65) Prior Publication Data

US 2016/0359393 A1 Dec. 8, 2016

(30) Foreign Application Priority Data

Jun. 3, 2015 (JP) ................................ 2015-112934

(51) Int. Cl.
| | |
|---|---|
| *H02K 9/28* | (2006.01) |
| *H02K 1/32* | (2006.01) |
| *H02K 9/04* | (2006.01) |
| *H02K 5/14* | (2006.01) |
| *H02K 9/06* | (2006.01) |

(52) U.S. Cl.
CPC ............... *H02K 9/28* (2013.01); *H02K 5/141* (2013.01); *H02K 9/06* (2013.01); *H02K 1/32* (2013.01); *H02K 9/04* (2013.01)

(58) Field of Classification Search
CPC ............ H02K 5/141; H02K 9/28; H02K 1/32; H02K 9/04; H02K 9/06
USPC .......................................................... 310/59
See application file for complete search history.

(56) References Cited

U.S. PATENT DOCUMENTS

| | | | | |
|---|---|---|---|---|
| 4,959,576 A | * | 9/1990 | Horibe ................... | H02K 5/141 310/232 |
| 5,777,407 A | * | 7/1998 | Ishida ................... | H01L 25/112 257/E25.025 |
| 6,060,802 A | * | 5/2000 | Masegi ................... | H02K 5/141 310/239 |
| 6,294,856 B1 | | 9/2001 | Ishida et al. | |
| 6,515,398 B1 | * | 2/2003 | Fudono ................... | H02K 5/141 310/239 |
| 6,710,499 B2 | * | 3/2004 | Tsuge ..................... | H02K 5/141 310/227 |

(Continued)

FOREIGN PATENT DOCUMENTS

| | | |
|---|---|---|
| JP | 2000-139056 A | 5/2000 |
| JP | 2001-352715 A | 12/2001 |

(Continued)

*Primary Examiner* — Alex W Mok
(74) *Attorney, Agent, or Firm* — Oliff PLC (57) ABSTRACT

A rotary electric machine includes a rotating shaft 18 rotatably supported by a housing, a stator including armature windings, a rotor including field cores and field windings, slip rings electrically connected to the field windings, brushes contacted and electrically connected to the slip rings, and a brush holder including the brushes and terminals. The rotor is provided with one or more fans. The terminals include exposed portions exposed at least partially from the brush holder, and the exposed portion are disposed on a ventilation path of a cooling airflow W generated by rotation of the fans. Accordingly, since the exposed portion are disposed on the ventilation path of the cooling airflow, heat caused by an energization can be efficiently dissipated, and heat generated in the brushes due to the interfacial friction is dissipated from the exposed portions.

7 Claims, 7 Drawing Sheets

(56) References Cited

U.S. PATENT DOCUMENTS

| | | | |
|---|---|---|---|
| 6,882,069 B1 | 4/2005 | Kashihara et al. | |
| 2001/0030472 A1* | 10/2001 | Ihata | H02K 9/06 |
| | | | 310/64 |
| 2002/0105242 A1* | 8/2002 | Takahashi | H02K 5/141 |
| | | | 310/91 |
| 2003/0160534 A1* | 8/2003 | Tsuge | H02K 5/141 |
| | | | 310/239 |
| 2006/0273685 A1* | 12/2006 | Wada | H02K 5/141 |
| | | | 310/239 |
| 2007/0188042 A1* | 8/2007 | Kaneda | H02K 5/141 |
| | | | 310/239 |
| 2013/0106236 A1* | 5/2013 | Roman | H02K 11/0089 |
| | | | 310/239 |
| 2014/0001915 A1 | 1/2014 | Fukase et al. | |
| 2014/0001951 A1 | 1/2014 | Hwang et al. | |
| 2014/0035431 A1 | 2/2014 | Fukase et al. | |
| 2014/0327345 A1* | 11/2014 | Han | H02K 11/026 |
| | | | 310/68 B |
| 2015/0054363 A1 | 2/2015 | Shimano et al. | |
| 2015/0216083 A1 | 7/2015 | Kanazawa et al. | |
| 2015/0333594 A1* | 11/2015 | Kuroda | H02K 11/046 |
| | | | 310/43 |

FOREIGN PATENT DOCUMENTS

| | | |
|---|---|---|
| JP | 2005-224044 A | 8/2005 |
| JP | 2015-043640 A | 3/2015 |
| WO | 2012/169007 A1 | 12/2012 |
| WO | 2013/014783 A1 | 1/2013 |
| WO | 2014/188803 A1 | 11/2014 |

* cited by examiner

ROTARY ELECTRIC MACHINE

CROSS-REFERENCE TO RELATED APPLICATION

This application is based on and claims the benefit of priority from earlier Japanese Patent Application No. 2015-112934 filed Jun. 3, 2015, the description of which is incorporated herein by reference.

TECHNICAL FIELD

The present disclosure relates to a rotary electric machine having a rotating shaft, a stator, a rotor, slip rings, brushes, and a brush holder.

BACKGROUND

Conventionally, an example of a technique regarding a vehicular AC generator for a purpose of being able to maintain ventilation passage shapes reliably is disclosed (refer to Japanese Patent Application Laid-Open Publication No. 2000-139058, for example).

The vehicular AC generator includes a recess disposed in either one of a brush holder and a slip ring cover, and a partition member disposed in a remaining one of the brush holder and the slip ring cover, the partition member is inserted into the recess to divide the recess, and forms a ventilation passage communicating with slide-contacting portions between slip rings of brushes.

Pigtails connected and fixed to the brushes are respectively soldered to connection terminals that are embedded in an end portion in a radial direction of the brush holder.

The brushes are cooled by cooling air flowing through the ventilation passage when applying the disclosure described in the Publication No. 2000-139058.

However, the connection terminals embedded in the brush holder are facing away from the ventilation passage.

Therefore, there is a problem that heat generated in the connection terminals caused by energization is not efficiently removed.

SUMMARY

An embodiment provides a rotary electric machine that can efficiently dissipate heat generated in terminals or brushes.

A rotary electric machine in a first aspect includes a rotating shaft rotatably supported by a housing, a stator including armature windings fixed to the housing, a rotor fixed to the rotating shaft, and including field cores and field windings, slip rings fixed to the rotating shaft and electrically connected to the field windings, brushes contacted and electrically connected with the slip rings, and an insulating brush holder accommodating the brushes and the insulating brush holder having terminals electrically connected to the brushes.

The rotor is provided with one or more fans. The terminals include exposed portions exposed at least partially from the brush holder. The exposed portions are disposed on a ventilation path of a cooling airflow generated by rotation of the fans.

According to this configuration, since the exposed portions included in the terminals are disposed on the ventilation path of the cooling airflow, the heat that occurs at the terminals accompanying the energization can be efficiently dissipated.

Since the heat generated in the brushes due to the interfacial friction is dissipated from the exposed portions conducting through the terminals, thereby reducing the temperature of the brushes.

Therefore, the function of the brushes can be maintained, and it is possible to extend the life of the brushes.

In the rotary electric machine, in a second aspect, the brushes include an anode brush and a cathode brush, and the cathode brush is electrically connected so as to be at the same potential as the housing.

In the rotary electric machine, in a third aspect, the terminals include an anode terminal and a cathode terminal, and the exposed portions are included in the cathode terminal.

In the rotary electric machine, in a fourth aspect, the exposed portions are formed in a concave-convex shape.

The rotary electric machine, in a fifth aspect, surfaces of the exposed portions are treated with a surface treatment agent providing electrical insulation and thermal conductivity.

In the rotary electric machine, in a sixth aspect, the brush folder includes a plurality of the exposed portions.

In the rotary electric machine, in a seventh aspect, the plurality of the exposed portions are disposed dispersed on two or more surfaces in the brush holder.

Note that the term housing may be referred to as a bracket, a case, a cover, or the like, and may be constituted by a single member or may be constituted by a plurality of members.

A terminal is a conductive member that is formed to be electrically connectable.

The rotary electric machine can be any type as long as the device has a portion that rotates (for example, a shaft or the like).

For example, a generator, an electric motor, a motor-generator or the like is applicable.

The rotor is formed into a circular shape (including an annular, cylindrical, or the like).

An armature winding is also referred to as a stator winding, and it can be any type as long as there are three or more phase windings.

An insulating property is a property of ensuring electrical insulation, and may be of any suitable materials or shapes.

A surface area means an area that performs heat transfer or heat dissipation.

DETAILED DESCRIPTION OF THE PREFERRED EMBODIMENTS

Hereinafter, embodiments for implementing the present disclosure will be described with reference to the drawings.

Note that to connect means to connect electrically unless otherwise specified.

Each drawing shows elements necessary for describing the present disclosure, and does not necessarily show all actual elements.

When mentioning directions up, down, left and right, etc., they are based on the description in the drawings.

Hatch lines (cross-hatched lines in particular) are given to exposed portions of terminals contained in a brush holder regardless of whether it is a cross-sectional view in order to facilitate distinguishing them from other portions.

Alphanumeric consecutive signs are abbreviated using the term to.

For example, rotary electric machines 10A to 10C means rotary electric machines 10A, 10B, and 10C.

Reference signs using upper and lower case characters refer to different elements.

Figure 2:
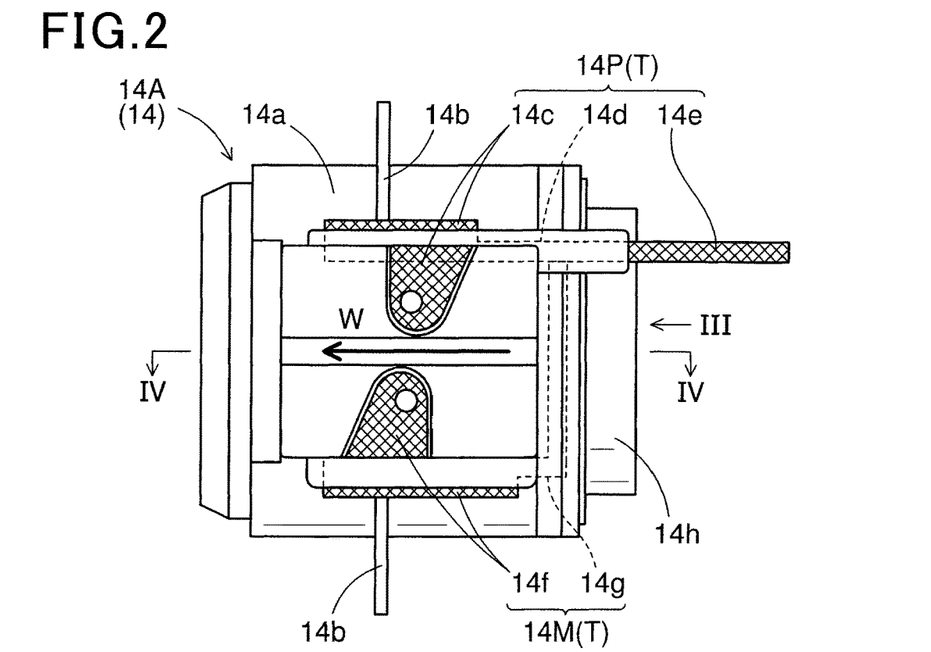
FIG. 2 shows a front view of a brush holder schematically in the first configuration.

For example, a brush holder 14A and a holder base portion 14a shown in FIG. 2 are separate elements.

The fixing method between the members is not particularly limited.

Although magnetic materials used are predominantly soft magnetic materials, the material, configuration or the like does not matter as long as a magnetic flux flows.

First Embodiment

A first embodiment will be described with reference to FIGS. 1 to 5.

Figure 1:
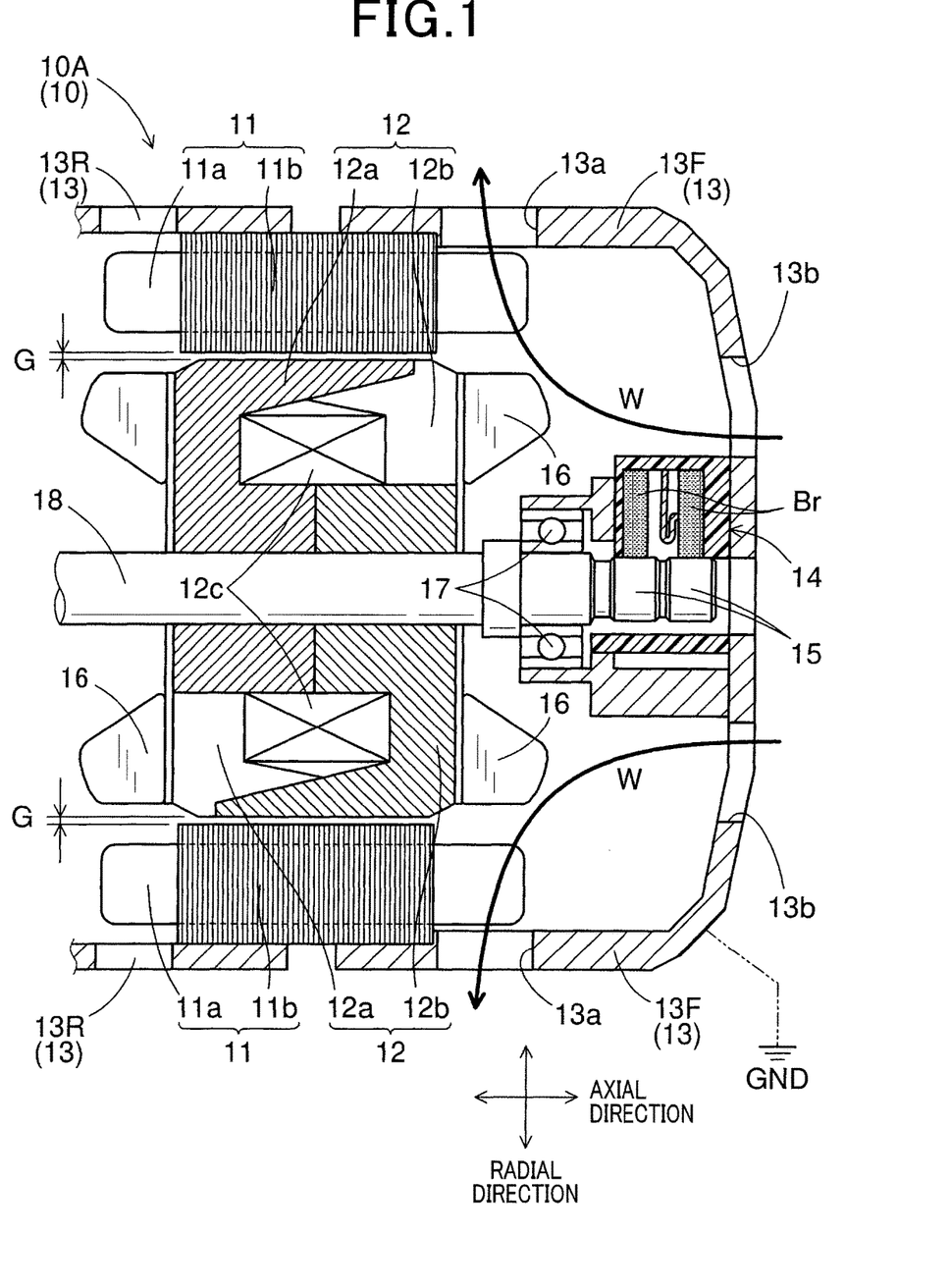
FIG. 1 shows a partial sectional view of a rotary electric machine schematically in a first configuration example.

A rotary electric machine 10A shown in FIG. 1 is an example of a rotary electric machine 10.

The rotary electric machine 10A has a stator 11, a rotor 12, a brush holder 14, fans 16, and a rotating shaft 18 in a housing 13.

In the present embodiment, a potential of the housing 13 is set to the ground GND.

The ground GND is used as a common potential, and is not always 0 [V].

Note that FIG. 1 shows a cross-sectional view such that an upper half of FIG. 1 shows a cut-out field core 12a, and a lower half of FIG. 1 shows a cut-out field core 12b.

The housing 13 may be formed in any shape as long as the above described elements are accommodated therein, and FIG. 1 is only an example.

The housing 13 of a configuration example shown in FIG. 1 has a front bracket 13F, rear bracket 13R or the like.

The housing 13 is provided with such as cooling air discharge holes 13a and cooling air intake holes 13b.

The housing 13 also referred to such as a frame or a case.

Although not shown, the housing 13 may be configured to accommodate at least one of a pulley, a rotational angle sensor, and a semiconductor element.

A MOSFET, a diode or the like corresponds to the semiconductor element accommodated in the housing 13, for example, and the semiconductor element is typically a member difficult to dispose on a circuit board due to a space limitation or the like.

The stator 11 corresponds to an armature, and includes armature windings 11a and an armature core 11b.

The armature windings 11a are windings of three or more phases, and are accommodated in slots included in the armature core 11b and incorporated therein.

The rotor 12 is disposed with an air gap G between the stator 11 (specifically the armature core 11b).

A size (or width) of the air gap G may be arbitrarily set as long as the magnetic flux flows between the stator 11 and the rotor 12.

The rotor 12 includes a pair of field cores 12a, 12b, and field windings 12c.

The field core 12a and the field core 12b having predetermined shapes are configured to face each other in an axial direction.

Each of the field cores 12a, 12b has a plurality of claw-shaped magnetic poles (not shown).

Each of the claw-shaped magnetic poles is disposed in a circumferential direction at an end portion of the rotor 12 in the armature core 11b side, and is formed in a tapered shape at a predetermined pitch.

The predetermined shapes are that, for example, portions having the claw-shaped magnetic poles have U-shaped (including J-shaped) sectional shapes as shown in FIG. 1, and portions other than the claw-shaped magnetic poles have annular shapes.

The claw-shaped magnetic poles of the field core 12a and the claw-shaped magnetic poles of the field core 12b are disposed alternately to face each other so as to engage.

The field cores 12a, 12b including at least the claw-shaped magnetic poles are formed by a magnetic material.

The field windings 12c are disposed so as to be sandwiched between the field core 12a and the field core 12b.

By energizing the field windings 12c, the claw-shaped magnetic poles of the field cores 12a and the claw-shaped magnetic poles of the field core 12b are magnetized in different magnetic poles to each other (i. e., N pole or S pole).

A plurality of fans 16 are an example of a cooling section.

Each fan 16 is fixed to axial end surfaces of the rotor 12 near the armature windings 11a.

When the fans 16 rotate together with the rotor 12, cooling air W is sucked from the cooling air intake hole 13b, and the cooling air W is discharged from the cooling air discharge holes 13a (refer to thick lines with arrows in FIG. 1).

By the cooling air W flowing through inside the housing 13, an entire rotary electric machine 10 including the brush holder 14 to be described later (refer to FIGS. 2 to 4), the stator 11 (in particular, the armature windings 11a), and the like can be cooled.

Since bearings 17 are interposed between the housing and the rotating shaft 18, the rotating shaft 18 is rotatably supported.

The rotating shaft 18 is directly (or indirectly) fixed to the rotor 12, and is also a rotating member that rotates together with the rotor 12.

Slip rings 15 are fixed to the rotating shaft 18.

Although not shown, the slip rings 15 are connected to the field windings 12c.

Further, the slip rings 15 are connected capable of transmitting power and signals by contacting with brushes Br contained in the brush holder 14 (for example, an anode brush 14p and a cathode brush 14m shown in FIG. 4 that are described later)

The brush holder 14 having an insulating property accommodates and holds the brushes Br, and includes terminals T to be connected for transmitting the power and signals between the field windings 12c and a control section.

The control section performs a rotation control of the rotary electric machine 10A by applying a current to the armature windings 11a or the field windings 12c, and performs a control charging of the power generated by the armature windings 11a or the field windings 12c to a secondary battery.

The control section corresponds to a control section 20 shown in FIG. 10, for example, to be described later.

Figure 3:
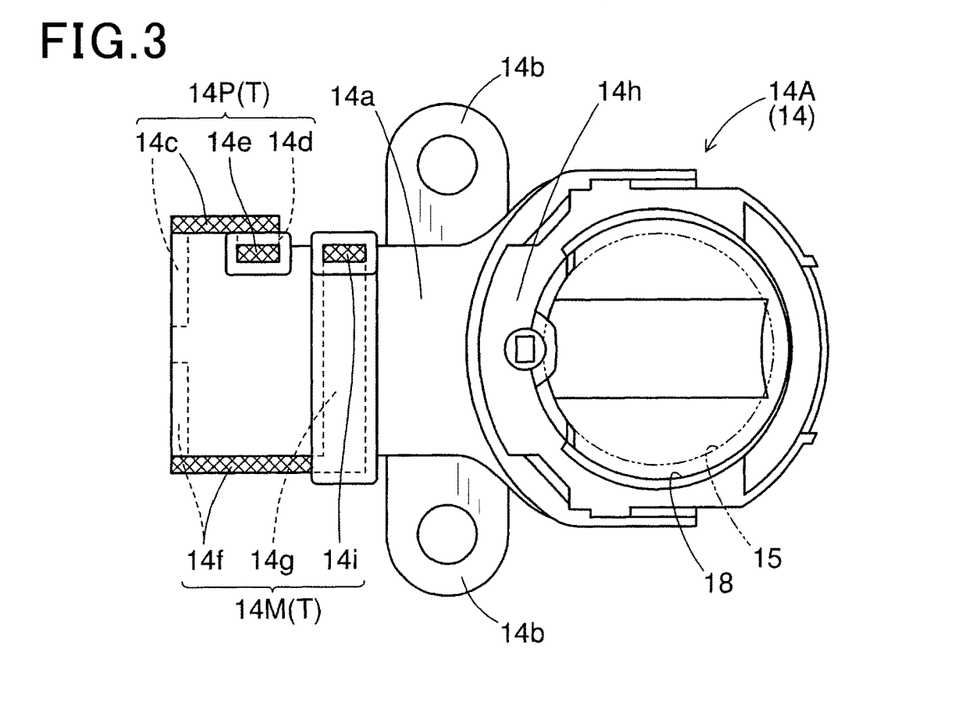
FIG. 3 is a side view of the brush holder as viewed from an arrow III direction in FIG. 2.
Figure 4:
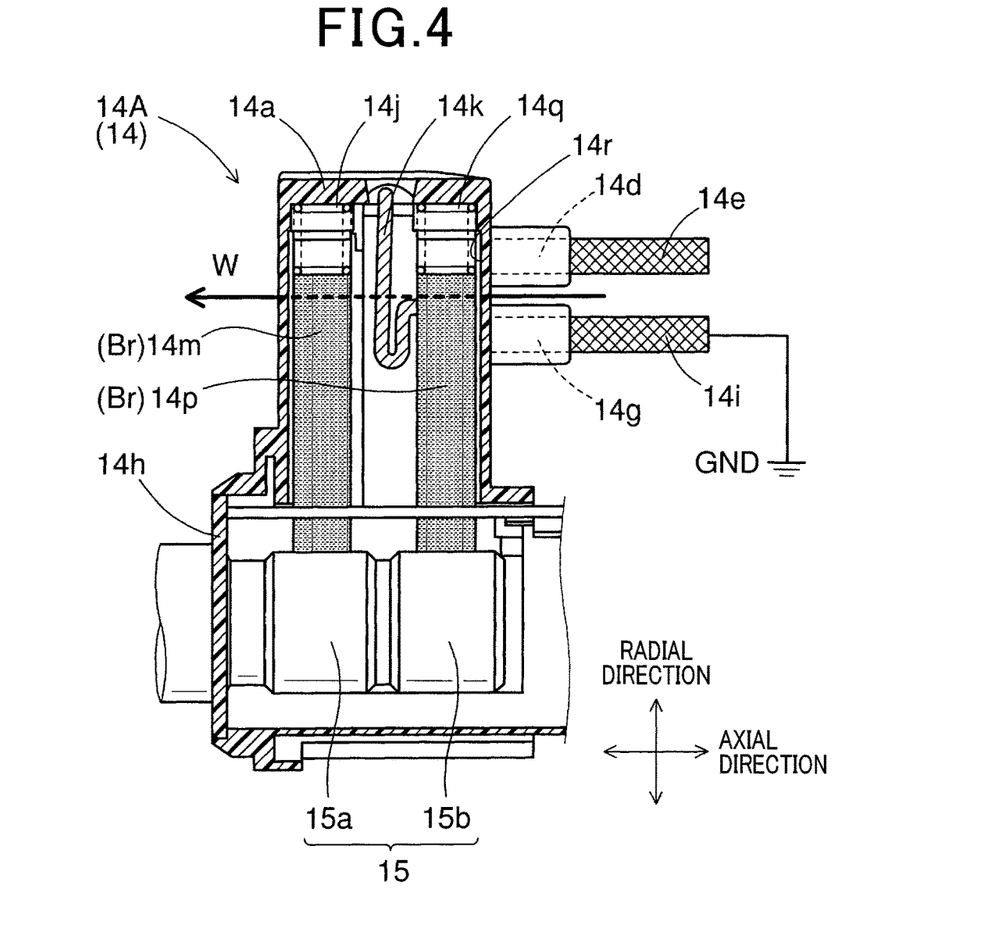
FIG. 4 shows a sectional view of the brush holder taken along a line IV-IV in FIG. 2.

A configuration example of the brush holder 14A is shown in FIGS. 2 to 4.

A brush holder 14A is an example of the brush holder 14.

The brush holder 14A shown in FIG. 2 has a holder base 14a, stay portions 14b, a shaft accommodating portion 14h, the terminals T, and the brushes Br shown in FIG. 4.

The holder base 14a, the stay portions 14b and the shaft accommodating portion 14h may be formed with any materials.

These members may be formed integrally, or may be fixed after being formed separately.

For each member, at least portions holding the terminals T or accommodating the brushes Br are preferably formed by an insulating material in order to prevent short-circuiting or current leakage from occurring.

The holder base 14a forms a framework of the brush holder 14A, and has an accommodation portion 14r that accommodates the brushes Br (refer to FIG. 4).

The stay portions 14b are formed extending from the holder base 14a to fix the brush holder 14A itself to the housing 13 (to the front bracket 13F in the configuration example of FIG. 1).

The shaft accommodating portion 14h is formed extending from the holder base 14a (in particular, refer to FIG. 3) for accommodating the rotating shaft 18 (including the slip rings 15).

The terminals T made of conductive members include anode terminals 14P having positive potentials, and cathode terminals 14M having negative potentials (including zero potential).

A number of exposed portions that are included in the terminals T and expose from the brush holder 14A may be set to any number of one or more.

The anode terminals 14P of the present embodiment include exposed portions 14c, 14e exposed from the brush holder 14A and a non-exposed portion 14d, which is covered with the brush holder 14A.

Cross-hatched lines are given to the exposed portions 14c, 14e.

The exposed portions 14c, 14e and the non-exposed portion 14d are connected regardless of whether or not they are formed integrally.

The anode terminals 14P (for example, the non-exposed portion 14d) and the anode brush 14p are connected by a pigtail 14k shown in FIG. 4, for example.

The cathode terminals 14M of the present embodiment include the exposed portions 14f, 14i exposed from the brush holder 14A and a non-exposed portion 14g, which is covered with the brush holder 14A.

Cross-hatched lines are given to the exposed portions 14f, 14i.

The exposed portions 14f, 14i and the non-exposed portion 14g are connected regardless of whether or not being formed integrally.

The cathode terminals 14M are connected to the ground GND so that they become the same potential as the housing 13.

As shown in FIG. 4, the exposed portions 14i may be connected to the ground GND, or other portions included in the cathode terminals 14M may be connected to the ground GND.

It does not matter whether or not the other portions are exposed portions.

Since the cathode terminals 14M become the same potential as the housing 13, the exposed portions 14f, 14i need not be insulated.

Although not shown, the cathode terminals 14M are connected to the cathode brush 14m.

Since the cathode terminals 14M are connected to the ground GND as described above, the potential of the cathode brush 14m also becomes the same potential as the ground GND.

Each of the exposed portions 14c, 14e, 14f, 14i described above is disposed on a ventilation path of the cooling air W shown in FIGS. 1, 2.

In other words, the exposed portions 14c, 14e, 14f, 14i are actively cooled by the cooling air W.

The brushes Br, as shown in FIG. 4, include the anode brush 14p and the cathode brushes 14m that both are accommodated in the accommodation portion 14r.

The material and shapes of the anode brush 14p and the cathode brush 14m do not matter as long as they function as brushes.

The anode brush 14p is in contact and connected to an anode slip ring 15b urged by a spring 14q.

The cathode brush 14m is in contact and connected to a cathode slip ring 15a at all times urged by a spring 14j.

Needless to say that between the cathode slip ring 15a and the anode slip ring 15b is insulated and both slip rings 15a, 15b are respectively connected to the field windings 12c (not shown).

Figure 5:
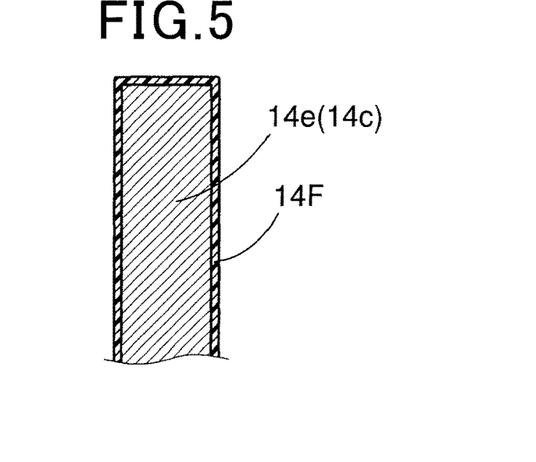
FIG. 5 shows an example of a cross-sectional view of an exposed portion of which a surface is treated with a surface treatment agent.

A surface of the anode terminal 14P is treated with a surface treatment agent 14F except a portion to be joined to connecting lines as shown in FIG. 5.

Although FIG. 5 shows an example of exposed portion 14e of which the surface is treated, it is similar even when treating a surface of the exposed portion 14c.

Any kind of the surface treatment agent 14F is applicable as long as it is electrically insulating and thermally conductive.

For example, thermosetting resins are applicable, and an epoxy resin containing an epoxy-based paint is preferred.

The connecting lines are conductive members for transmitting the power and signals between the control section (or external devices).

According to the first embodiment described above, it is possible to obtain each of the following effects.

(1) The rotary electric machine 10A is configured such that the fans 16 are disposed on the rotor 12, the terminals T include the exposed portions 14c, 14e, 14f, 14i of which exposed at least partially from the brush holder 14, and the exposed portions 14c, 14e, 14f, 14i are disposed on the ventilation path of the cooling air W generated by the rotation of the fans 16 (refer to FIGS. 1 to 4).

According to this configuration, since the exposed portions 14c, 14e, 14f, 14i included in the terminals T are disposed on the ventilation path of the cooling air W, the heat that occurs at the terminals T accompanying the energization can be efficiently dissipated.

The heat generated in the brushes Br due to the interfacial friction is dissipated from the exposed portions 14c, 14e, 14f, 14i conducting through the terminals T, thereby reducing the temperature of the brushes Br.

Therefore, the function of the brushes Br can be maintained, and it is possible to extend the life of the brushes Br.

(2) The brushes Br include the anode brush 14p and the cathode brush 14m, and the brushes Br are configured such that the cathode brush 14m is connected to be the same potential as the housing 13 (i. e., ground GND) (refer to FIG. 1, FIG. 4).

According to this configuration, since the cathode brush 14m becomes the same potential as the housing 13, the insulation between the cathode brush 14m and the housing 13 is not required.

Since an insulating member for insulating is not required, and such a process of assembling the insulating member is not required, the manufacturing cost of the rotary electric machine 10 can be reduced.

Further, an amount corresponding to the insulating member that is not required, it is possible to reduce the size of the rotary electric machine 10.

(3) The terminals T have the anode terminals 14P and the cathode terminals 14M, and the terminals T are configured such that the exposed portions 14f, 14i are included in the cathode terminals 14M (refer to FIG. 2, FIG. 3).

According to this configuration, the surfaces of the exposed portions 14c, 14e included in the anode terminals 14P are treated with the surface treatment agent 14F, and the exposed portions 14f, 14i included in the cathode terminal 14M are exposed without the surfaces thereof being treated.

Since the exposed portions 14f, 14i included in the cathode terminals 14M are not necessary to be insulated, the exposed portions 14f, 14i are not necessary to be covered with the insulating members.

That is, since the exposed portions 14f, 14i are exposed without being covered in any way, it is possible to improve the coolability of the terminals T including the exposed portions 14f, 14i.

(5) The surfaces of the exposed portions 14c, 14e are configured to be treated with the surface treatment agent 14F providing electrical insulation and thermal conductivity (refer to FIG. 5).

According to this configuration, the insulation properties and the heat dissipation of the surface treatment agent 14F treated on the surfaces of the exposed portions 14c, 14e are secured.

That is, while securing the insulation, the heat generated in the terminals T, the brushes Br, etc. can be efficiently dissipated.

(6) The brush holder 14 is configured to have the plurality of exposed portions 14c, 14e, 14f, and 14i (refer to FIG. 2, FIG. 3).

According to this configuration, surface areas of the exposed portions 14c, 14e, 14f, 14i in the entire brush holder 14 are increased, thereby improving the coolability of the terminals T.

(7) The plurality of exposed portions 14c, 14e, 14f, 14i are configured to be disposed dispersing on two or more surfaces in the brush holder 14 (refer to FIGS. 2, 3, and FIGS. 6 to 9).

According to this configuration, since the plurality of exposed portions 14c, 14e, 14f, 14i are disposed dispersing on two or more surfaces in the brush holder 14, the cooling can be performed reliably even when the ventilation path of the cooling air W is changed.

Therefore, the coolability of the terminals T in the entire brush holder 14 improves.

Second Embodiment

A second embodiment will be described with reference to FIGS. 6, 7.

It should be appreciated that, in the second embodiment, components identical with or similar to those in the first embodiment are given the same reference numerals, and repeated structures and features thereof will not be described in order to avoid redundant explanation unless otherwise specified.

Therefore, different points from the first embodiment will be mainly described.

Figure 6:
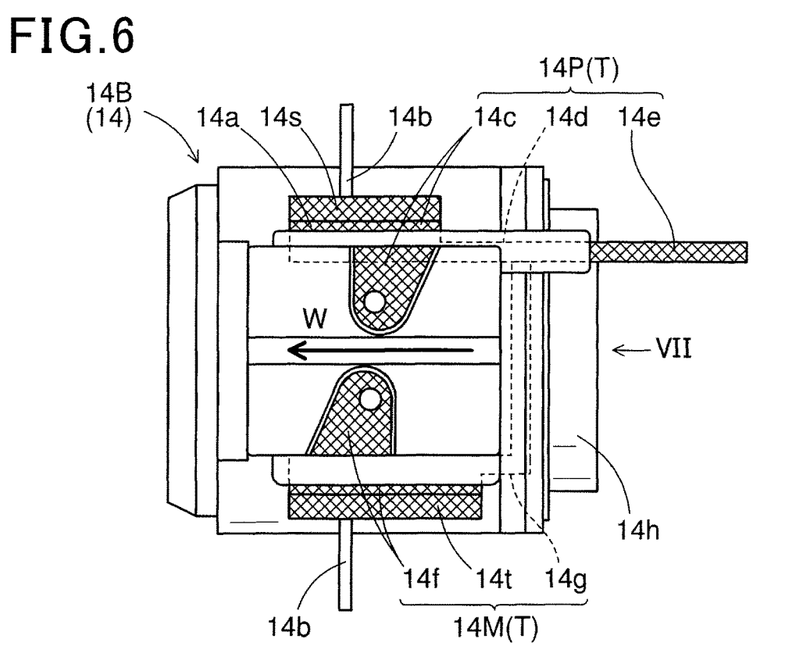
FIG. 6 shows a front view of a brush holder schematically in a second configuration.
Figure 7:
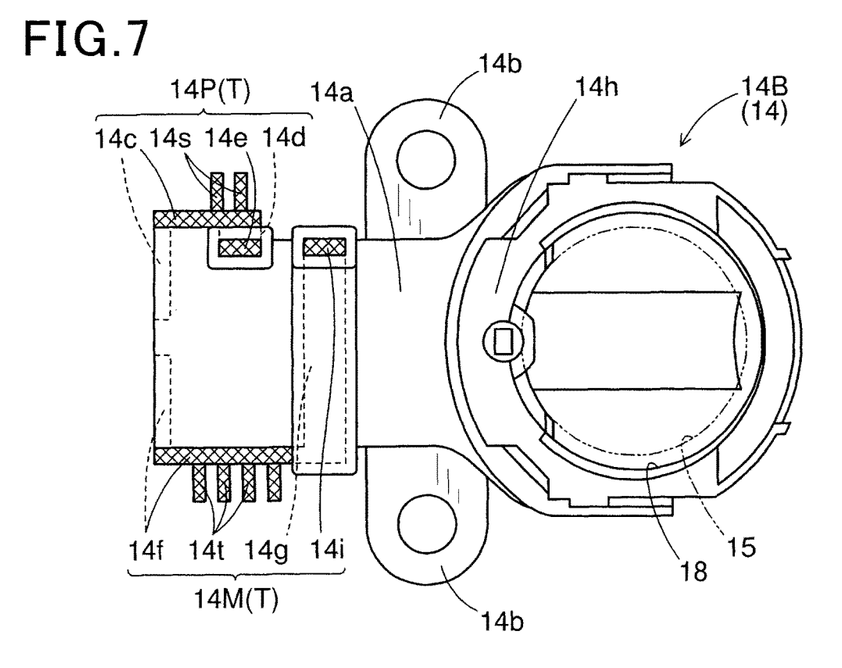
FIG. 7 is a side view of the brush holder as viewed from an arrow VII direction in FIG. 6.

A brush holder 14B shown in FIGS. 6, 7 is an example of the brush holder 14.

The brush holder 14B shown in FIG. 6 has a holder base 14a, stay portions 14b, a shaft accommodating portion 14h, the terminals T, and the brushes Br shown in FIG. 4.

FIG. 6 corresponds to FIG. 2, and FIG. 7 corresponds to FIG. 3.

The brush holder 14B that is different from the brush holder 14A shown in FIGS. 2, 3 is to have further more exposed portions 14s, 14t.

Similar to the exposed portions 14c, 14e, 14f, 14i, the exposure portions 14s, 14t are disposed on the ventilation path of the cooling air W shown in FIGS. 1, 4, 6.

In other words, the exposed portions 14s, 14t are actively cooled by the cooling air W.

The exposed portions 14s are parts of the anode terminals 14P, and are connected to the exposed portions 14c.

The exposed portions 14s may be formed integrally with the exposed portions 14c or they may be formed separately and fixed to each other.

The exposed portions 14t are parts of the cathode terminals 14M, and are connected to the exposed portions 14f.

The exposed portions 14t may be formed integrally with the exposed portions 14f or they may be formed separately and fixed to each other.

The exposed portion 14s, 14t are common to each other that they expose in the plurality of surfaces of the brush holder 14B, and they are formed in a concave-convex shape.

However, the number and shape of the concave-convex of the exposed portions 14t and the exposed portions 14s may be set arbitrarily.

The exposed portions 14s, 14t of the present embodiment are configured by fins (refer to FIG. 6, FIG. 7).

The convex portions may be formed in a direction along the cooling air W shown in FIG. 6 in order to increase the coolability of the fins.

According to the second embodiment described above, it is possible to obtain the following effects.

Note that the exposed portions 14s, 14t can also obtain the same effects as the above-mentioned (1), (3), (5), (6), and (7).

(4) The exposed portions 14s, 14t are configured to be formed in the concave-convex shape (refer to FIG. 6, FIG. 7).

According to this configuration, since surface areas of the exposed portions 14s, 14t increase, the coolability of the terminals T improves.

Third Embodiment

A third embodiment will be described with reference to FIGS. 8, 9.

It should be appreciated that, in the third embodiment, components identical with or similar to those in the first and second embodiments are given the same reference numerals, and repeated structures and features thereof will not be described in order to avoid redundant explanation unless otherwise specified.

Therefore, different points from the first and second embodiments will be mainly described.

Figure 8:
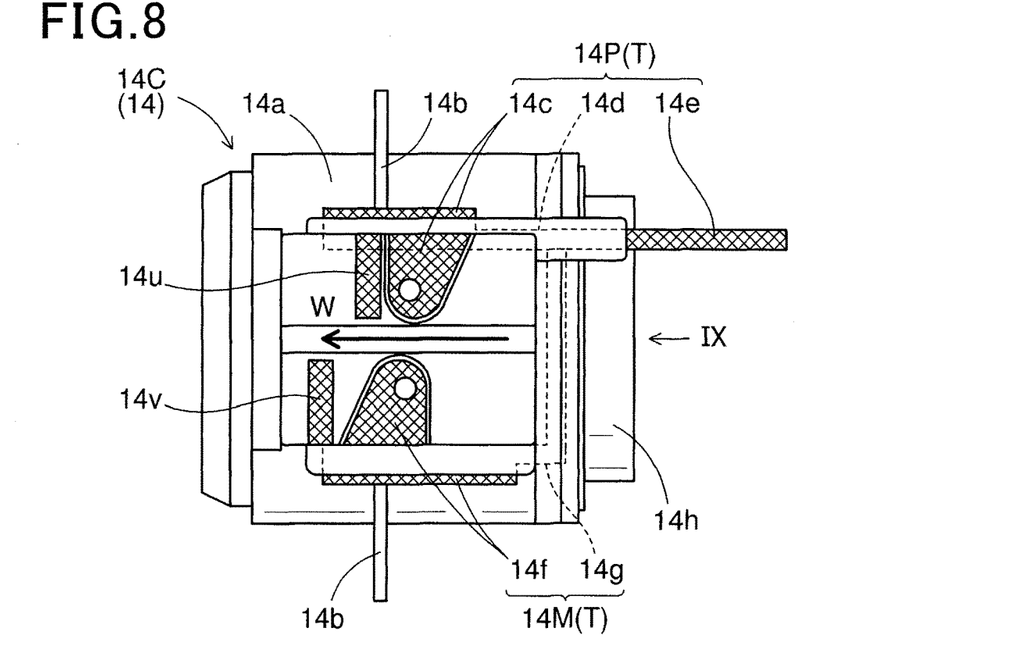
FIG. 8 shows a front view of a brush holder schematically in a third configuration.
Figure 9:
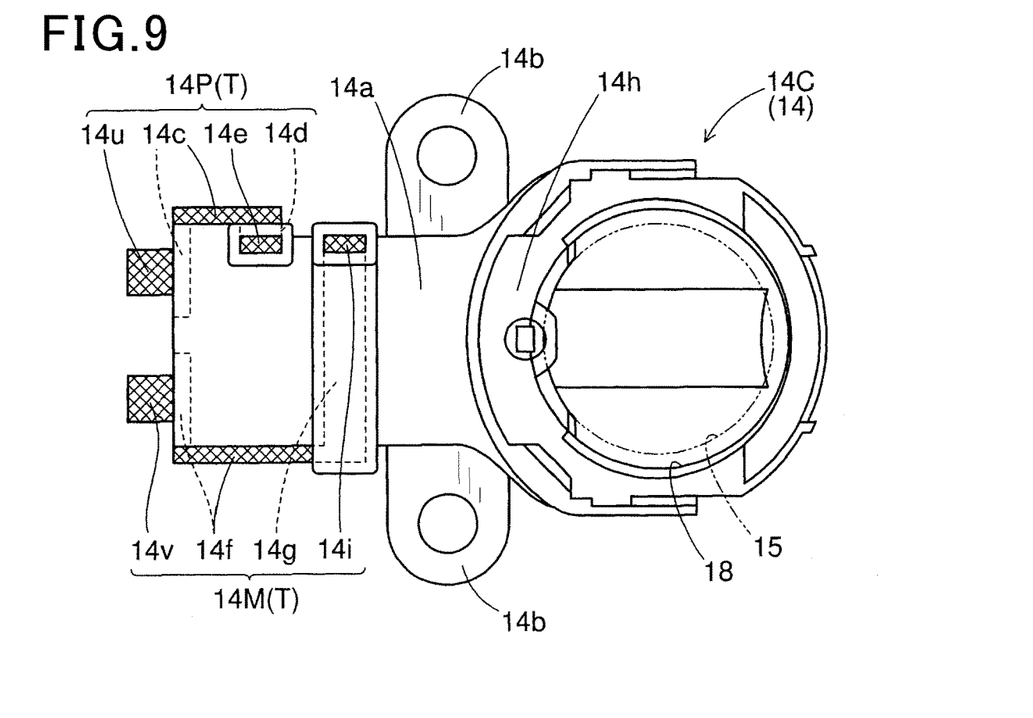
FIG. 9 is a side view of the brush holder as viewed from an arrow IX direction in FIG. 8.

A brush holder 14C shown in FIGS. 8, 9 is an example of the brush holder 14.

The brush holder 14C shown in FIG. 8 has a holder base 14a, stay portions 14b, a shaft accommodating portion 14h, the terminals T, and the brushes Br shown in FIG. 4.

FIG. 8 corresponds to FIG. 2, and FIG. 9 corresponds to FIG. 3.

The brush holder 14B that is different from the brush holder 14A shown in FIGS. 2, 3 has more exposed portions 14u, 14v.

Similar to the exposed portions 14c, 14e, 14f, 14i, the exposure portions 14u, 14v are disposed on the ventilation path of the cooling air W shown in FIGS. 1, 4, 8.

In other words, the exposed portions 14u, 14v are actively cooled by the cooling air W.

The exposed portion 14u is a part of the anode terminals 14P, and is connected to the exposed portions 14c.

The exposed portion 14u may be formed integrally with the exposed portions 14c or they may be formed separately and fixed to each other.

The exposed portion 14v is a part of the cathode terminals 14M, and is connected to the exposed portions 14f.

The exposed portion 14v may be formed integrally with the exposed portions 14f or they may be formed separately and fixed to each other.

The exposed portion 14u, 14t are different from the exposed portions 14c, 14f in that the exposed portion 14u, 14t are respectively disposed on a different surface to the exposed portions 14c, 14f, and moreover that the exposed portions 14u, 14t include convex portions.

According to the third embodiment described above, the exposed portions 14u, 14v can obtain the same effects as the above-mentioned (1), (3), (5), (6), and (7).

Fourth Embodiment

The fourth embodiment will be described with reference to FIG. 10.

It should be appreciated that, in the fourth embodiment, components identical with or similar to those in the first to third embodiments are given the same reference numerals, and repeated structures and features thereof will not be described in order to avoid redundant explanation unless otherwise specified.

Therefore, different points from the first to third embodiments will be mainly described.

Figure 10:
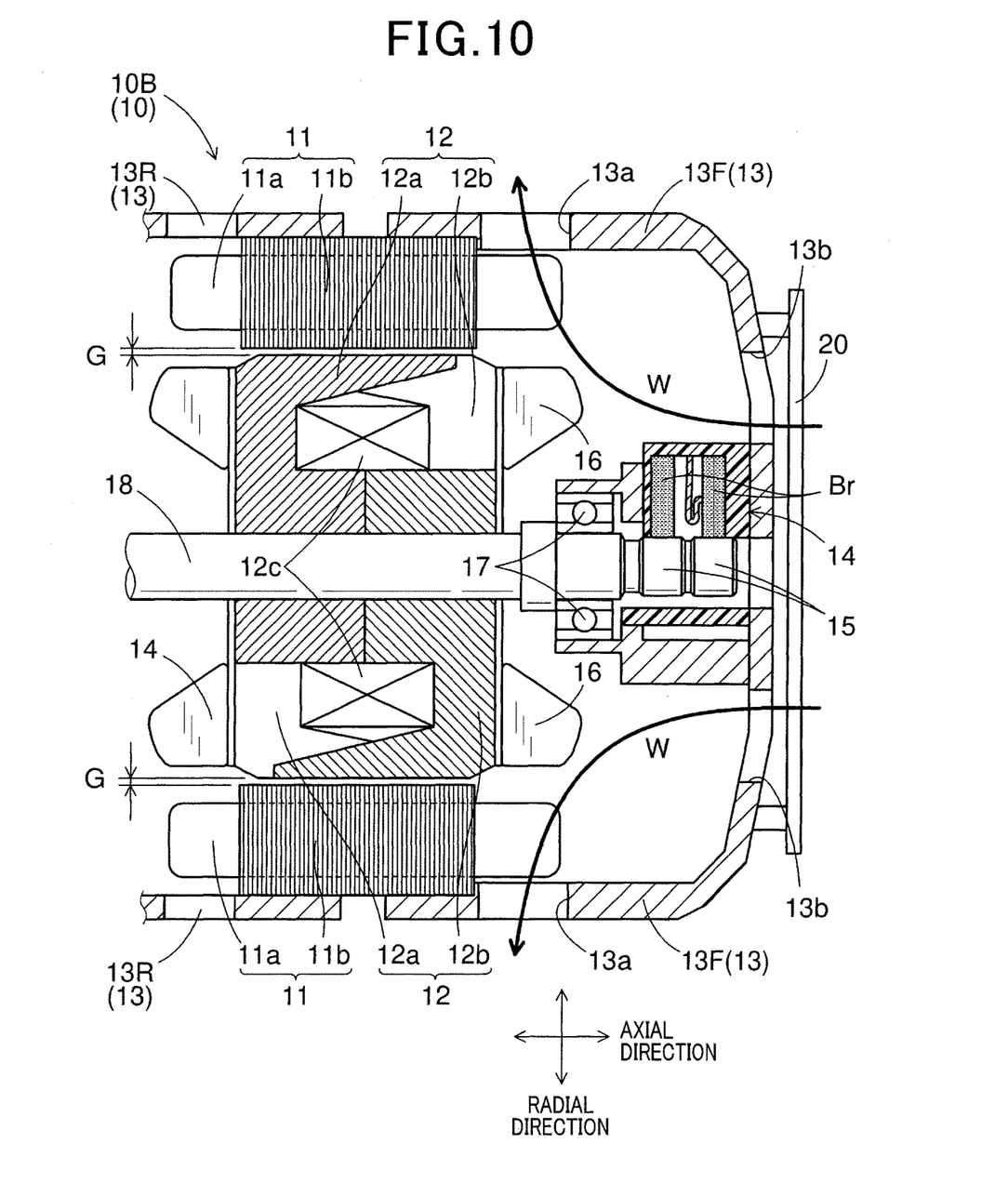
FIG. 10 shows a partial sectional view of a rotary electric machine schematically in a second configuration example.

A rotary electric machine 10B shown in FIG. 10 is another example of a rotary electric machine 10.

The rotary electric machine 10B has, as well as the rotary electric machine 10A shown in the first embodiment (refer to FIG. 1), a stator 11, a rotor 12, a brush holder 14, fans 16, and a rotating shaft 18 in a housing 13.

A point the rotary electric machine 10B is different from the rotary electric machine 10A is that the rotary electric machine 10B further includes a control section 20 which is fixed to the housing 13.

The control section 20 may include an inverter, a control circuit, and the like.

Note that a cover that protects the control section 20 is not shown in FIG. 10.

Note that any of the brush holders 14A, 14B, 14C may be applied to the brush holder 14.

Although not shown, a MOSFET that is a semiconductor element, and a cooling member (such as a fin or a heat sink) for cooling the MOSFET are accommodated in the housing 13.

The control section 20 performs a rotation control of the rotary electric machine 10A by applying a current to the armature windings 11a and the field windings 12c, and performs a charging control of the electric power generated by the armature windings 11a and the field windings 12c to the secondary battery in accordance with the signal transmitted from the external device.

In the rotation control, the control of applying the current to the armature windings 11a and the field windings 12c in accordance with an angular velocity or a rotational angle position is performed so that a detected value reaches a target value.

One or more among the angular velocity of the rotating shaft 18, torque of the rotary electric machine 10A, a generated electric power or the like corresponds to the detected value.

The angular velocity or the rotational angular position is detected by a rotation angle detection sensor (not shown) provided in the housing 13.

The target value is included in the signal transmitted from the external device.

Instead of (or in addition to) using the angular velocity, an angular acceleration may be used, or a rotational speed may also be used.

The secondary battery corresponds to a lithium ion battery or an electrochemical cell (specifically, such as a lead-acid battery or a nickel cadmium battery), for example.

Configurations of the control section 20 and the external device may be set arbitrarily, and an ECU (Electronic Control Unit) or a computer may correspond to them, for example.

According to the fourth embodiment described above, since it merely further includes the control section 20, the same effects as the first to third embodiments can be obtained.

Fifth Embodiment

A fifth embodiment will be described with reference to FIG. 11.

It should be appreciated that, in the fourth embodiment, components identical with or similar to those in the first to fourth embodiments are given the same reference numerals, and repeated structures and features thereof will not be described in order to avoid redundant explanation unless otherwise specified.

Therefore, different points from the first to fourth embodiments will be mainly described.

Figure 11:
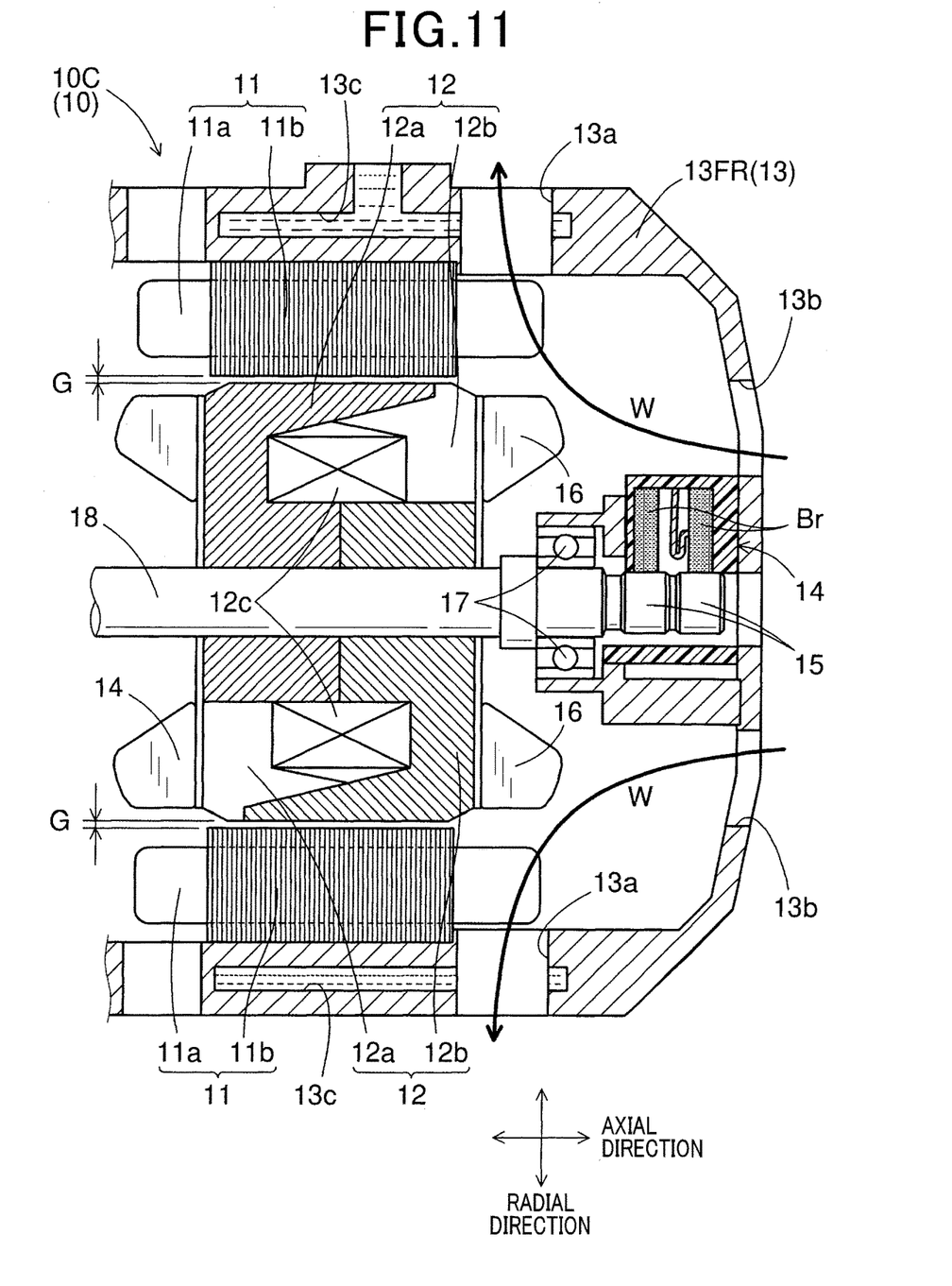
FIG. 11 shows a partial sectional view of a rotary electric machine schematically in a third configuration example.

A rotary electric machine 10C shown in FIG. 11 is another example of a rotary electric machine 10.

The rotary electric machine 10C has, as well as the rotary electric machine 10A shown in the first embodiment (refer to FIG. 1), a stator 11, a rotor 12, a brush holder 14, fans 16, and a rotating shaft 18 in a housing 13.

A point in which the rotary electric machine 10C is different from the rotary electric machine 10A is a housing 13.

First, an integral bracket 13FR obtained by integrating the front bracket 13F and the rear bracket 13R is used for the housing 13.

Second, the housing 13 further includes cooling water channels 13c.

Note that any of the brush holders 14A, 14B, 14C may be applied to the brush holder 14.

The cooling water channels 13c are passages where a cooling medium flows for cooling the rotary electric machine 10C.

Although not shown, an inlet for introducing the cooling medium and an outlet for discharging the cooling medium are provided with the housing 13.

The cooling medium is a fluid, and cooling water or cooling oil may correspond to the cooling medium, for example.

Together with the cooling by the cooling water channels 13c and the cooling by the cooling wind W, the rotary electric machine 10C can be further cooled.

According to the fifth embodiment described above, since merely further including the cooling water channels 13c in the housing 13, the same effects as the first to third embodiments can be obtained.

Although not shown, as in the fourth embodiment, the control section 20 may be integrated with the housing 13.

Other Embodiments

Although it has been described in accordance with the first to fifth embodiments for the present disclosure in the above, the present disclosure is not in any way limited to the embodiments described above.

In other words, various modifications are possible within the scope of the present disclosure.

For configuration examples described below may be realized.

In the first to fifth embodiments described above, the stay portions 14b are configured not to be connected to the terminals T (refer to FIG. 3, FIG. 7, FIG. 9).

Instead of the above embodiments, the stay portions 14b may be configured to be formed by conductive members, and may be connected with the cathode terminals 14M included in the terminals T.

The stay portions 14b and the cathode terminals 14M may be formed integrally.

Since the stay portions 14b are fixed to the housing 13, the cathode terminals 14M become the same potential as the housing 13 through the stay portions 14b.

Therefore, the same effect as (2) in the first to fifth embodiments can be obtained.

In the second embodiment described above, both of the exposed portions 14s, 14t are configured by fins (refer to FIG. 6, FIG. 7).

Instead of the above embodiment, although not shown, one or both of the exposed portions 14s, 14t may be configured by a heat sink.

Regarding the exposed portions 14u, 14v shown in the third embodiment, (refer to FIG. 8, FIG. 9) concavo-convex shapes including a fin or a heat sink may also be formed.

In any case, the surface areas of exposed portions included in the terminals T increase, thus the same effects as the second and third embodiments can be obtained.

In the fourth embodiment described above, the rotary electric machine 10B is configured to fix the control section 20 to the outside of the housing 13 (refer to FIG. 10).

Instead of the above embodiment, the rotary electric machine 10B may be configured to fix the control section 20 within the housing 13.

Since the disposition of the control section 20 is the only difference, the same effects as the fourth embodiment can be obtained.

In the first to fifth embodiments described above, the surfaces of the exposed portions 14c, 14e included in the anode terminals 14P are configured to be treated with the surface treatment agent 14F (refer to FIG. 5).

Instead of the above embodiments, similarly to the exposed portions 14f, 14i included in the cathode terminals 14M, the surfaces of the exposed portions 14c, 14e may be configured to be exposed without the treatment.

The coolability of the terminals T can be improved for an amount of the surface treatment agent 14F that does not exist.

Further, the exposed portions 14c, 14e included in the anode terminal 14P except portions connected with the connecting lines may be configured to be covered by the brush holder 14 as well as the non-exposed portion 14d.

In the first to fifth embodiments described above, the exposed portion 14c, 14e included in the anode terminals 14P and the exposed portions 14f, 14i included in the cathode terminals 14M are configured to be disposed on different surfaces in the brush holder 14 (refer to FIG. 2, FIG. 3, FIGS. 6 to 9).

Instead of the above embodiments, under the condition that the insulation is reliably secured, the exposed portions 14c, 14e and the exposed portions 14f, 14i may be configured to be disposed on the same surface in the brush holder 14.

Since the disposition of the exposed portions is the only difference, the same effects as the first to fifth embodiments can be obtained.

In the first to fifth embodiments described above, the claw-shaped magnetic poles are configured to be formed by the magnetic material (refer to FIG. 1, FIG. 10, FIG. 11).

Instead of the above embodiments, the claw-shaped magnetic poles may be configured to be formed by magnets magnetized in N-pole or S-pole, or may be configured to be formed by combining the magnetic material and the magnet.

Since the magnetomotive force source is the only difference, the same effects as the first to fifth embodiments can be obtained.

Further, since the claw-shaped magnetic poles themselves become the magnetomotive force source, it is possible to reduce the number of turns of the field windings 12c or it is possible to remove the field windings 12c.

Since it is possible to form the claw-shaped magnetic poles larger for the amount of the field winding 12c being reduced (or removed), it is possible to increase the generated magnetic flux.

In the first to fifth embodiments described above, the rotor 12 and the fans 16 are configured to be formed separately and fixed together (refer to FIG. 1, FIG. 10, FIG. 11).

Instead of the above embodiments, the rotor 12 (specifically, the field cores 12a, 12b) and the fans 16 may be configured to be formed integrally.

Since forming these separately or integrally is the only difference, the same effects as the first to fifth embodiments can be obtained.

What is claimed is:

1. A rotary electric machine comprising:
    a rotating shaft rotatably supported by a housing;
    a stator including armature windings, the stator being fixed to the housing;

a rotor fixed to the rotating shaft, the rotor including field cores and field windings and being provided with fans;

slip rings fixed to the rotating shaft and electrically connected to the field windings;

brushes contacted and electrically connected with the slip rings; and an insulating brush holder accommodating the brushes, the insulating brush holder including:
   stay portions; and
   terminals electrically connected to the brushes and electrically insulated from the stay portions, the terminals including exposed portions exposed at least partially from the insulating brush holder and disposed on a ventilation path of a cooling airflow generated by rotation of the fans, the exposed portions each including a surface having a major axis in parallel with a flow direction of the cooling airflow.

2. The rotary electric machine according to claim 1, wherein,
   the brushes include an anode brush and a cathode brush, and
   the cathode brush is electrically connected so as to be at a same potential as the housing.

3. The rotary electric machine according to claim 1, wherein,
   the terminals include an anode terminal and a cathode terminal, and
   the exposed portions are included in the cathode terminal.

4. The rotary electric machine according to claim 1, wherein the exposed portions are formed in a concave-convex shape.

5. The rotary electric machine according to claim 1, wherein surfaces of the exposed portions are treated with a surface treatment agent providing electrical insulation and thermal conductivity.

6. The rotary electric machine according to claim 1, wherein the insulating brush holder includes a plurality of the exposed portions.

7. The rotary electric machine according to claim 6, wherein,
   the plurality of the exposed portions are disposed dispersed on two or more surfaces in the insulating brush holder.

* * * * *